US010403066B2

(12) United States Patent
Trani

(10) Patent No.: US 10,403,066 B2
(45) Date of Patent: Sep. 3, 2019

(54) PORTABLE DEVICE HAVING DIRECTIONAL BLE ANTENNA

(71) Applicant: Sensormatic Electronics, LLC, Boca Raton, FL (US)

(72) Inventor: James Trani, Billerica, MA (US)

(73) Assignee: Sensormatic Electronics, LLC, Boca Raton, FL (US)

(*) Notice: Subject to any disclaimer, the term of this patent is extended or adjusted under 35 U.S.C. 154(b) by 265 days.

(21) Appl. No.: 15/160,775

(22) Filed: May 20, 2016

(65) Prior Publication Data
US 2016/0344091 A1 Nov. 24, 2016

Related U.S. Application Data

(60) Provisional application No. 62/164,054, filed on May 20, 2015, provisional application No. 62/181,434, (Continued)

(51) Int. Cl.
G06F 17/30 (2006.01)
G07C 9/00 (2006.01)
(Continued)

(52) U.S. Cl.
CPC .......... G07C 9/00119 (2013.01); G06F 21/32 (2013.01); G07C 9/00007 (2013.01); G07C 9/00079 (2013.01); H01Q 1/243 (2013.01); H01Q 1/3241 (2013.01); H01Q 1/36 (2013.01); H01Q 9/0407 (2013.01); H01Q 21/061 (2013.01); H04W 4/021 (2013.01); H04W 4/06 (2013.01); H04W 4/80 (2018.02); G07C 2209/04 (2013.01)

(58) Field of Classification Search
None
See application file for complete search history.

(56) References Cited

U.S. PATENT DOCUMENTS 7,035,650 B1 4/2006 Moskowitz et al.
8,009,013 B1 8/2011 Hirschfeld et al.
(Continued)

FOREIGN PATENT DOCUMENTS

EP 1981183 A2 10/2008
GB 2468731 A 9/2010
(Continued)

OTHER PUBLICATIONS

This Antenna Bends But Wont Break, https://www.technologyreview.com/s/416561/this-antenna-bends-but-wont-break/ (Year: 2009).*
(Continued)

Primary Examiner — Brandon S Hoffman
(74) Attorney, Agent, or Firm — HoustonHogle LLP

(57) ABSTRACT

A system and method for a portable device analyzing user information broadcast from target user devices is disclosed. The portable device includes a commodity user device (e.g. iPhone, smart phone) and a directional antenna system fastened to the commodity user device for receiving the user information broadcast from the target user devices. An application program executing on the portable device can then be used to disable a user account on an access control system, for example.

17 Claims, 7 Drawing Sheets

Related U.S. Application Data filed on Jun. 18, 2015, provisional application No. 62/185,349, filed on Jun. 26, 2015, provisional application No. 62/193,907, filed on Jul. 17, 2015.

(51) Int. Cl.

| | | |
|---|---|---|
| *H04W 4/021* | (2018.01) | |
| *G06F 21/32* | (2013.01) | |
| *H01Q 1/24* | (2006.01) | |
| *H01Q 1/36* | (2006.01) | |
| *H01Q 9/04* | (2006.01) | |
| *H04W 4/06* | (2009.01) | |
| *H01Q 1/32* | (2006.01) | |
| *H01Q 21/06* | (2006.01) | |
| *H04W 4/80* | (2018.01) | |

(56) References Cited

U.S. PATENT DOCUMENTS

| | | | |
|---|---|---|---|
| 8,430,310 B1 | 4/2013 | Ho et al. | |
| 9,697,656 B2 | 7/2017 | Trani | |
| 2004/0153671 A1 | 8/2004 | Schuyler et al. | |
| 2005/0062649 A1 | 3/2005 | Chiang et al. | |
| 2006/0270458 A1* | 11/2006 | Watanabe | G08C 17/02 455/562.1 |
| 2006/0279422 A1 | 12/2006 | Sweatte | |
| 2007/0109111 A1 | 5/2007 | Breed et al. | |
| 2008/0164995 A1 | 7/2008 | Coronel et al. | |
| 2008/0285802 A1 | 11/2008 | Bramblet et al. | |
| 2009/0219152 A1 | 9/2009 | Angelo et al. | |
| 2010/0094482 A1 | 4/2010 | Schofield et al. | |
| 2010/0194566 A1 | 8/2010 | Monden | |
| 2010/0233975 A1 | 9/2010 | Wu et al. | |
| 2011/0314539 A1 | 12/2011 | Horton | |
| 2011/0316703 A1 | 12/2011 | Butler et al. | |
| 2012/0040650 A1* | 2/2012 | Rosen | H04M 3/2218 455/414.1 |
| 2012/0062422 A1 | 3/2012 | Wu et al. | |
| 2012/0062427 A1 | 3/2012 | Wu | |
| 2012/0154115 A1 | 6/2012 | Herrala | |
| 2012/0181333 A1* | 7/2012 | Krawczewicz | G06K 19/0718 235/380 |
| 2012/0202560 A1* | 8/2012 | Donaldson | H04M 1/6066 455/552.1 |
| 2012/0242481 A1 | 9/2012 | Gernandt et al. | |
| 2012/0280783 A1 | 11/2012 | Gerhardt et al. | |
| 2012/0330849 A1 | 12/2012 | Nielsen et al. | |
| 2013/0002399 A1 | 1/2013 | Frueh | |
| 2013/0138314 A1 | 5/2013 | Viittala et al. | |
| 2013/0149991 A1 | 6/2013 | Hepo-Oja | |
| 2013/0176107 A1 | 7/2013 | Dumas et al. | |
| 2013/0214898 A1 | 8/2013 | Pineau et al. | |
| 2013/0237193 A1 | 9/2013 | Dumas et al. | |
| 2013/0237272 A1 | 9/2013 | Prasad | |
| 2014/0015978 A1 | 1/2014 | Smith | |
| 2014/0077929 A1 | 3/2014 | Dumas et al. | |
| 2014/0129006 A1 | 5/2014 | Chen et al. | |
| 2014/0167912 A1 | 6/2014 | Snyder et al. | |
| 2014/0183269 A1 | 7/2014 | Glaser | |
| 2014/0197989 A1 | 7/2014 | Hepo-Oja | |
| 2014/0201537 A1 | 7/2014 | Sampas | |
| 2014/0240088 A1 | 8/2014 | Robinette et al. | |
| 2014/0253326 A1 | 9/2014 | Cho et al. | |
| 2014/0266585 A1 | 9/2014 | Chao et al. | |
| 2015/0071274 A1 | 3/2015 | Sugar et al. | |
| 2015/0348220 A1 | 12/2015 | Sharma et al. | |
| 2016/0055692 A1 | 2/2016 | Trani | |
| 2016/0267760 A1 | 9/2016 | Trani | |
| 2016/0284147 A1 | 9/2016 | Trani | |
| 2016/0284183 A1 | 9/2016 | Trani | |
| 2016/0343187 A1 | 11/2016 | Trani | |
| 2017/0256107 A1 | 9/2017 | Trani | |

FOREIGN PATENT DOCUMENTS

| | | |
|---|---|---|
| WO | 9606409 A1 | 2/1996 |
| WO | 2016028481 A1 | 2/2016 |

OTHER PUBLICATIONS

International Preliminary Report on Patentability, dated Nov. 30, 2017, from International Application No. PCT/US2016/033600, filed May 20, 2016. 8 pages.

International Search Report and Written Opinion of the International Searching Authority, dated Sep. 5, 2016, from International Application PCT/US2016/033600, filed May 20, 2016. Twelve pages.

"Apriva Reader." Apriva. Retrieved from http://www.apriva.com/iss/solutions/apriva-reader. 2 pages. Dec. 2014.

"EK6 Bluetooth Proximity Reader: EK6 Installation Guide." EC Key. 2 pages. Mar. 2014.

EK6 Bluetooth Proximity Readers. EC Key, 2014. Retrieved from http://eckey.com/enterprise-access. 2 pages.

International Search Report and Written Opinion of the International Searching Authority, dated Oct. 28, 2015 from International Application PCT/US2015/043455, International Filing Date Aug. 3, 2015. Ten pages.

Martin, Zack. "Vodafone piloting emerging access control tech." SecureIDNews, Sep. 26, 2014. Retrieved from http://www.secureidnews.com/news-item/vodafone-piloting-emerging-access-control-tech. 2 pages.

International Search Report and Written Opinion of the International Searching Authority, dated Aug. 8, 2016 from International Application PCT/US2016/033597, International Filing Date May 20, 2016. Eleven pages.

\* cited by examiner

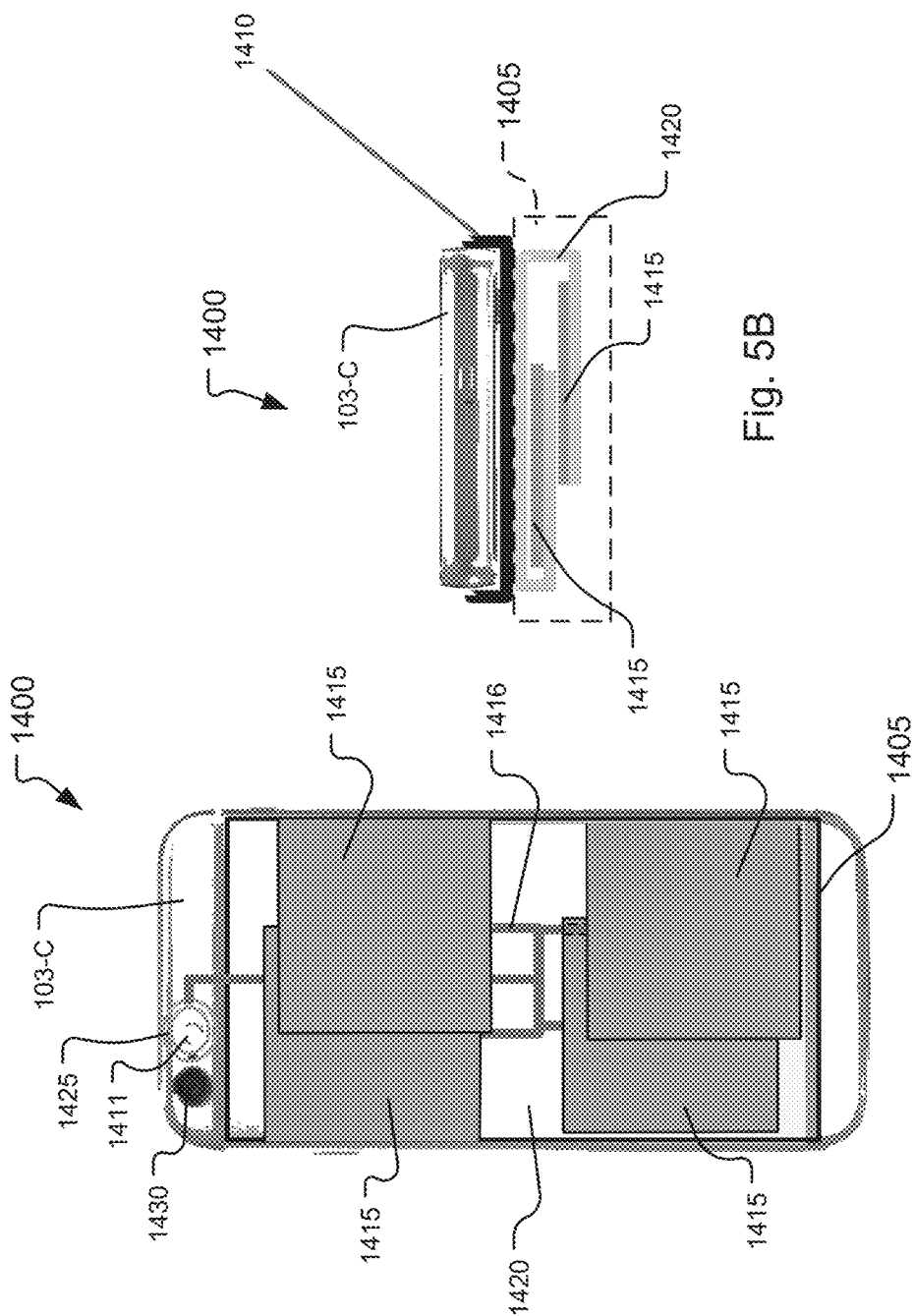

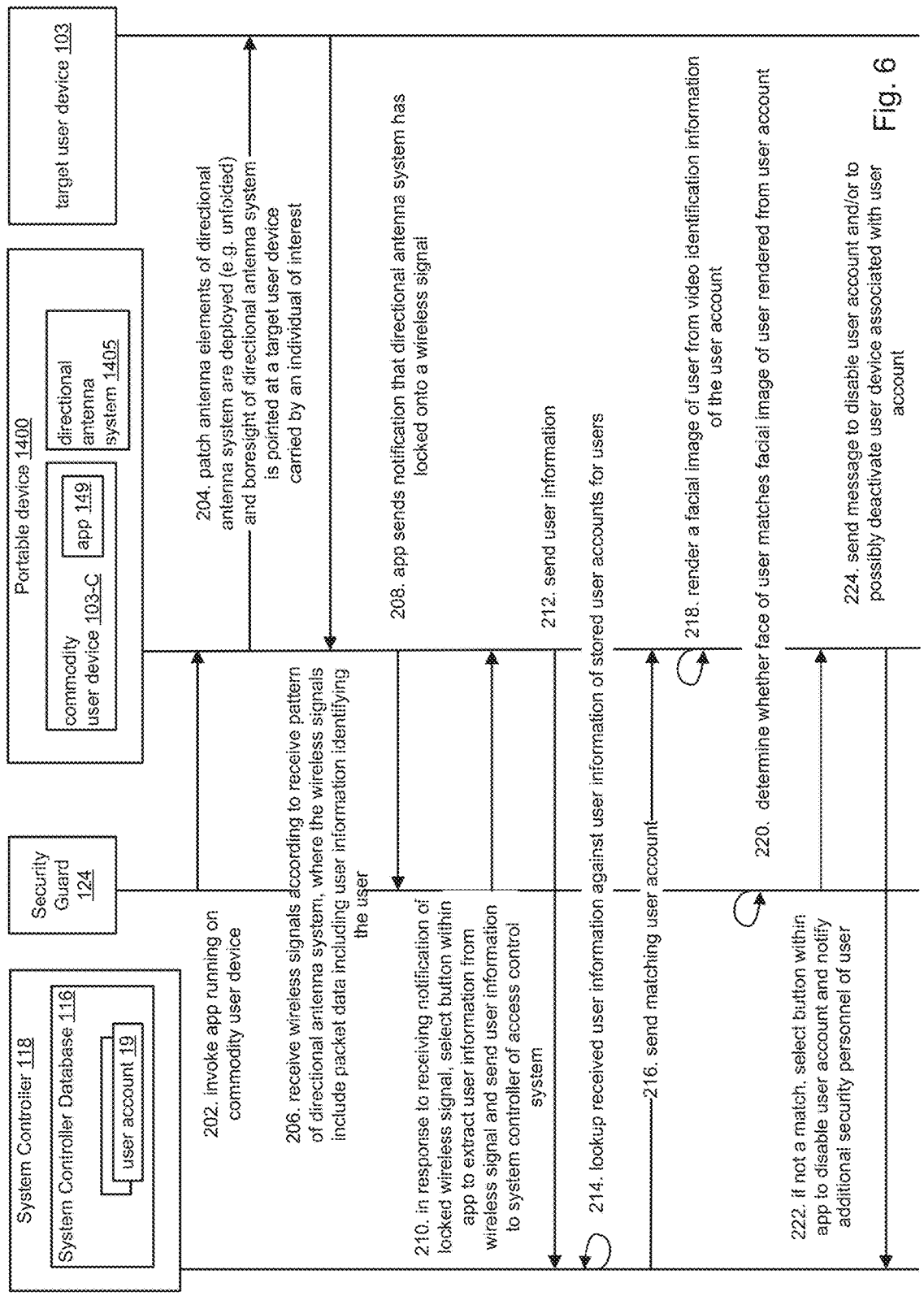

PORTABLE DEVICE HAVING DIRECTIONAL BLE ANTENNA

RELATED APPLICATIONS

This application claims the benefit under 35 USC 119(e) of U.S. Provisional Application No. 62/164,054, filed on May 20, 2015; 62/181,434, filed on Jun. 18, 2015; 62/185,349, filed on Jun. 26, 2015 and 62/193,907 filed on Jul. 17, 2015, all of which are incorporated herein by reference in their entirety.

This application is related to:

U.S. application Ser. No. 15/160,722, now U.S. Patent Publication No. 2016/0284147 A1, filed on May 20, 2016, entitled "Access Control System with Omni and Directional Antennas," by James Trani;

U.S. application Ser. No. 15/160,736, now U.S. Patent Publication No. 2016/0284183 A1, filed on May 20, 2016, entitled "Tailgating Detection in Frictionless Access Control System" by James Trani;

U.S. application Ser. No. 15/160,753, now U.S. Pat. No. 9,865,144, filed on May 20, 2016, entitled "Video Recognition in Frictionless Access Control System," by James Trani; and U.S. application Ser. No. 15/160,765, now U.S. Pat. No. 9,947,155, and International Application No. PCT/US16/33597, now International Publication No. WO 2016/187573, both filed on May 20, 2016, entitled "Frictionless Access System for Public Access Point," by James Trani.

BACKGROUND OF THE INVENTION

Security systems are often installed within and around buildings such as commercial, residential, or governmental buildings or other structures or areas where access should be controlled or monitored. Examples of these buildings include offices, hospitals, warehouses, schools or universities, shopping malls, government offices, and casinos. The security systems typically include components such as system controllers, access control readers, video surveillance cameras, network video recorders (NVRs), and door controllers, to list a few examples.

The access control readers are often installed throughout the buildings, or otherwise, to control access to restricted or monitored areas, such as buildings or areas of the buildings. The access control readers authenticate identities of (or authorize users and then permit those authenticated users to access the restricted areas.

Typically, users interact with the access control readers by swiping keycards or bringing contactless smart cards within range (approximately 2-3 inches or 5 centimeters) of a reader. The access control readers read the information of the keycards and then the access control systems determine if the users are authorized to access the restricted areas. If the users are authorized to enter the restricted areas, then the access control readers allow access to the restricted areas by unlocking locked doors, signaling that doors should be unlocked, or not generating alarm upon authorized user entry, for example.

SUMMARY OF THE INVENTION

Traditional security systems using access control readers have limitations. The systems require the individuals to present access cards to the card reader at each access point to gain access to the restricted areas. Individuals typically must place their access cards such that the access cards either make direct physical contact with the access readers or are within a few inches of the access readers. This formal interaction process can be an inconvenience to the users of the system.

More recently, frictionless access control and tracking systems have been introduced that overcome many of the limitations of traditional security systems using card readers. In these frictionless systems, users carry user devices that broadcast credential information in wireless signals that is then used at access points to authorize the user to pass through the access point, or not. An exemplary system is described in the related applications such as "Access Control System with Omni and Directional Antennas," which was incorporated by reference herein earlier.

The present invention further improves upon frictionless access systems by providing the ability to process the wireless signals sent from the user devices in a more selective fashion and by portable devices. For these purposes, the present invention provides a portable device that includes a commodity user device (e.g. an iPhone or other smart phone or mobile computing device) and a directional antenna system.

In general, according to one aspect, the invention features a portable device for analyzing user information broadcast from target user devices. The portable device including a directional antenna system for receiving the user information broadcast from the target user devices.

In embodiments, the directional antenna system comprises four or more patch antenna elements that function as fixed phased array antenna. In examples, four (4) patch antenna elements are provided, each of which are half-wavelength Bluetooth Low Energy (BLE) antennas.

Often, the device will include a commodity user device including a touchscreen display and an integrated internal antenna, wherein the directional antenna system is coupled to the internal antenna of the commodity user device.

Preferably, the directionality of the antenna system enables one or a few user devices to be isolated. Typically, a receive pattern has a half power beamwidth of a main lobe of less than 50 degrees, or smaller such as less than 30 degrees, or even 10 degrees, or less.

The directional antenna system can also be foldable.

In general, according to another aspect, the invention features a method for analyzing wireless signals from target user devices. The method comprises detecting the wireless signals using a directional antenna system, extracting user information from the wireless signals, and accessing an account for a user corresponding to the user information.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS in the accompanying drawings, reference characters refer to the same parts throughout the different views. The drawings are not necessarily to scale; emphasis has instead been placed upon illustrating the principles of the invention. Of the drawings:

FIG. 1 is a schematic diagram illustrating how security personnel, for example, can utilize the portable device to selectively receive wireless signals transmitted from target user devices as part of a user validation or tracking process, where the wireless signals include user information for identifying the users;

FIG. 2A is a schematic diagram showing a front view of the portable device, where a commodity user device (iPhone portable computing device, for example) of the portable device is executing an app, and where the app enables a security guard of a premises to determine whether individuals carrying target user devices are valid users of an access control system that controls access to the premises, and where the app is displaying an initial screen of information to the security guard for deciding whether to proceed with the validation process for a targeted user;

FIG. 5A is a schematic diagram showing a back view of the portable device with the directional antenna system folded;

Figure 1:
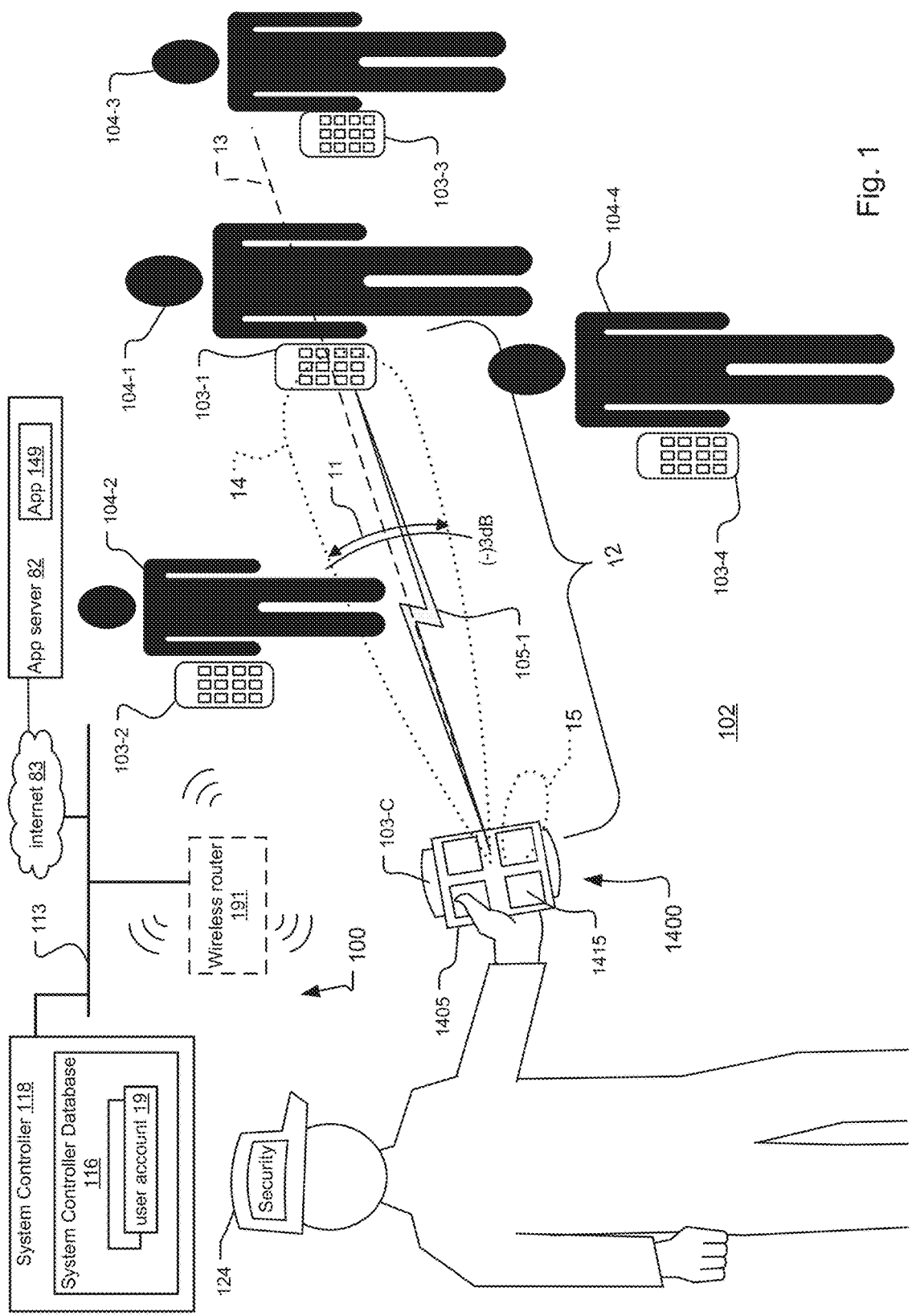

FIG. 5B is a schematic diagram showing a top edge of the portable device with the directional antenna system folded; and FIG. 6 is a sequence diagram showing how a security guard as in FIG. 1 can utilize the portable device to validate individuals carrying target user devices against an access control system, where the sequence diagram shows interactions between the security guard, the portable device carried by the security guard, the users carrying target user devices, and a system controller of the access control system that stores user account information of the users.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

FIG. 1 shows how an operator such as a security guard 124 of an exemplary premises 102 would typically use the portable device 1400 to both increase the effective range of the wireless signals received from the user devices 103 of the users 104, and to be more selective when validating the identity of each user. Because the user devices 103 of the users are targeted by the security guard 124 as part of a validation process, the user devices 103 of the users are also known as target user devices.

In FIG. 1, relevant components of an access control system 100 of the premises 102 are shown. A system controller 118 includes a system controller database 116, which in turn stores user accounts 19 for valid users 104. An app server 82 includes apps 149, which the portable device 1400 downloads from the app server 82. A wireless router 191 enables wireless communications between the portable device 1400 and the other components of the access control system 100, where the components of the access control system 100 communicate over a data network 113.

In a typical implementation, users 104 carry user devices 103 (e.g., fobs, smartphones, tablets, phablets, or other mobile computing devices), which broadcast packet data 105. The packet data 105 includes user information 88 for identifying the users. The user information 88 can include a unique user ID 98 for each of the user devices 103 and other information for identifying the user such as a username/password, name of user, department, work extension, personal phone numbers, email addresses, and employee ID number, in examples. In one example, the user ID includes a token or a hash of the token generated for the user 104, and it may or may not expire after a predetermined time.

In yet another example, a rolling security identification (id) or access code generated within the fob/user device 103 functions as the user ID. A rolling access code is a unique authentication code for each user 104. Each mobile phone user device 103 preferably transmits the access code at fixed periodic intervals.

The access code includes a random key or "seed" that is different for each fob/user device 103. The uniqueness of each key is accomplished by including the unique phone number of each mobile phone during calculation of the key, for example. In one implementation, the user ID for user devices 103 is a token generated for each user. Typically, the token will include a TOTP (Time-based One Time Password) combined with the rolling security identification (id) code, or rolling code, maintained within the user device 103. A rolling code typically generates an authentication code associated with each user 104 at fixed intervals. The mobile phone 103 creates a security token from the key, and generates a 16 byte hash of the security token. The mobile phone 103 then includes the hash of the security token as payload within packet data and broadcasts the packet data in wireless signals via Bluetooth.

Users carrying the user devices 103 enroll and/or register the user devices 103 with the system controller 118. When the user device is a fob, users access the system controller 118 to enroll the fob via a client application of the system controller 118. When the user device is a smart phone or other mobile computing device, 103, the users 104 download a security app from the app server 82 to their user device 103, where the security app provides access to the system controller 118.

An administrator will typically add authorization information associated with each of the users 104 to the user account 19 based on security objectives. Authorization information determines which users 104 are authorized to access specified restricted buildings or areas of a building 102.

The wireless packet data broadcast from the user devices 103 is preferably secured to prevent unauthorized third parties from intercepting and viewing the packet data during transmission (i.e. during broadcasts). In one example, the packet data is encrypted. In a preferred embodiment, the user devices 103 broadcast the packet data using BLE (Bluetooth low energy) technology.

Bluetooth is a wireless technology that operates in a 2.4 GHz (gigahertz) short-range radio frequency band. In free space, Bluetooth applications typically locate a Bluetooth device by calculating the distance of the user devices 103 from the signal receivers. The distance of the device from the receiver is closely related to the strength of the signal received from the device. A lower power version of standard Bluetooth called Bluetooth Low Energy (BLE), in contrast, consumes between ½ and ¹⁄₁₀₀ the power of classic Bluetooth. BLE is optimized for devices requiring maximum battery life, as compared to the emphasis upon higher data transfer rates associated with classic Bluetooth has a typical broadcast range of about 100-150 feet (approximately 35-46 meters).

When transmitting via BLE, the user devices 103 might send an AltBeacon compliant BLE broadcast message every second. If the user devices 103 utilize tokens as the user ID, the user devices 103 preferably include a hash representation of the token/user ID in the BLE broadcast messages. In one implementation, the hash representation of the token is a 16-byte, one-way hash of the token computed using the phone number of the user device 103 as the seed key.

In an alternative implementation, the user devices 103 are capable of broadcasting via standard Bluetooth. In still other alternative implementations, the user devices 103 may broadcast via other wireless technologies such as Wi-Fi (IEEE 802.11), active RFID (radio frequency identification), or ZigBee, to list a few examples.

In an exemplary situation, users 104-1 through 104-4 carrying target user devices 103-1 through 103-4 are located within the same room or area within the premises 102. Here, the security guard 124 is carrying the portable device 1400 and is pointing it towards target user device 103-1 of user 104-1 to validate user 104-1. The validation is based on the user information 88 sent from each user and received by the portable device 1400. The user information 88 sent from each user is included in packet data 105-1 of the wireless signal transmitted from the target user device 103-1 carried by each user 104.

The portable device 1400 preferably includes a commodity user device 103-C, and a directional antenna system 1405 which is attached to a back of the commodity user device 103-C. Examples of commodity user devices 103-C include iPhone devices, smartphones, tablet computing devices, and laptop computers running operating systems such as Windows, Android, Linux, or IOS, in examples. The directional antenna system 1405 preferably includes one or more patch antenna elements 1415. Although the directional antenna system 1405 can use fixed phased array antenna, a dynamic phased-array antenna, or a horn antenna in other embodiments.

In operation, the security guard 124 points a boresight 13 of the directional antenna system 1405 towards the target user device 103-1 of the user 104-1. The directional antenna system 1405 is characterized by a receive pattern 12 that includes a main lobe 14 and possibly side lobes 15, only one of which is shown. The main lobe 14 is oriented along an axis provided by the boresight 13.

In one example, the directional antenna system 1405 is characterized by a receive pattern 12 that has a half power beamwidth 11 of the main lobe 14 of less than 50 degrees wide. In another example, the half power beamwidth 11 of the main lobe 14 is less than 30 degrees wide. In yet another example, the half power beamwidth 11 of the main lobe 14 is less than 10 degrees wide.

This narrow receive pattern 12 of the directional antenna system 1405 enables the directional antenna system 1405 to selectively receive the wireless broadcasts from individual or only a few target user devices 103.

Figure 2A:
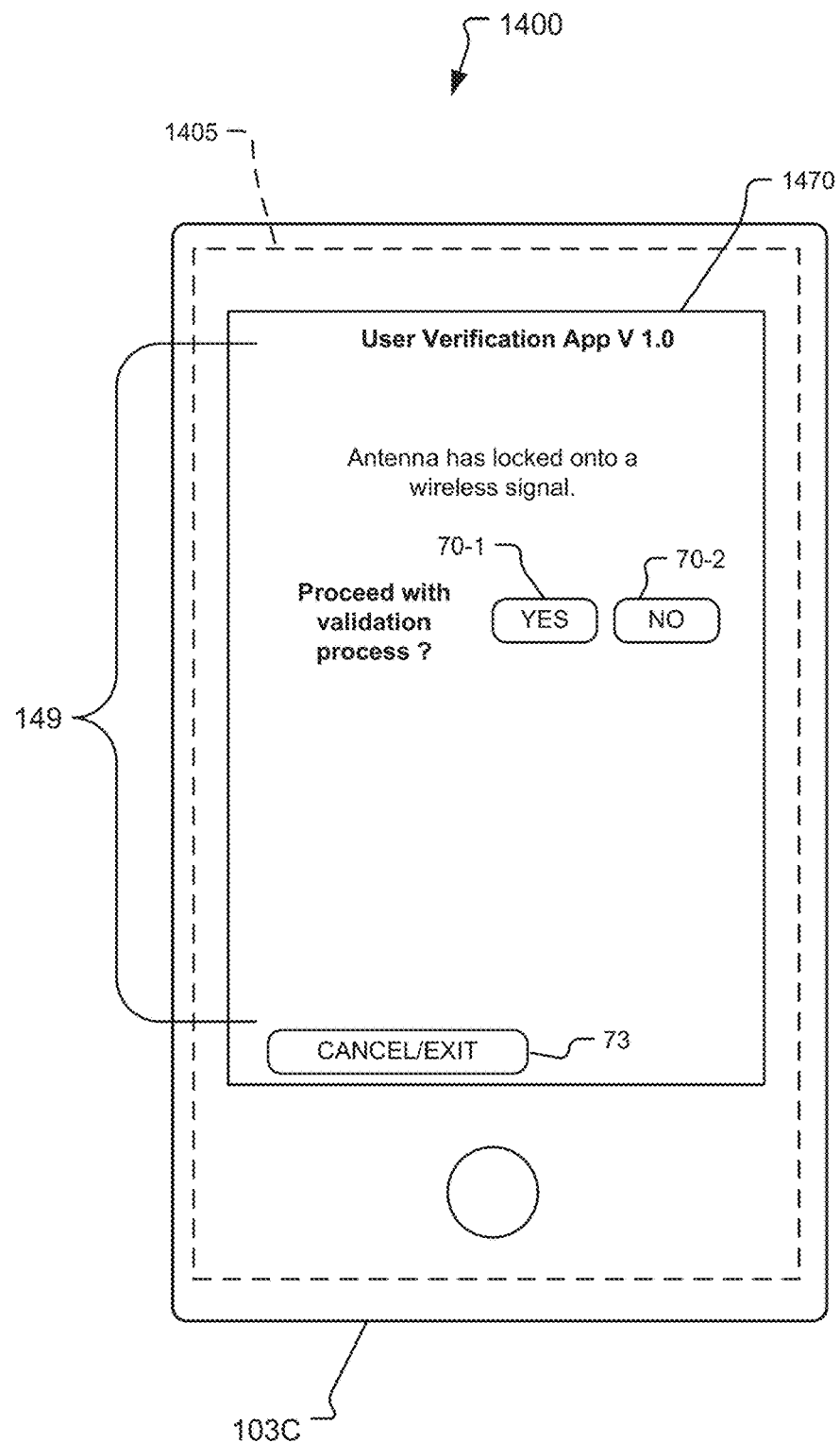
FIG. 2B is a schematic diagram similar to that displayed in FIG. 2A, where the app is displaying an additional screen of information in response to the security guard proceeding with the user validation in FIG. 2A, and where the additional screen of information enables to security guard to complete the validation process and make changes within the access control system for the user.

FIG. 2A shows the commodity user device 103-C of the portable device 1400 running an app 149 for validating users based on user information 88 included in their transmissions, such as BLE transmissions. The commodity user device 103-C includes a device touch screen display 1470 upon which the output from the app 149 is displayed.

The app 149 is displaying an initial screen of information, in response to the security guard 124 targeting a user and his/her target user device 103. The security guard 124 targeted the user 104 by pointing boresight 13 of the directional antenna system 1405 of the portable device 1400 towards the target user device 103 carried b the user. The portable device 1400 receives BLE transmission/wireless signals from the target user devices 103, via the directional antenna system 1405 of the portable device 1400. The wireless signals include packet data 105, which in turn includes the user information 88 of the user.

The initial screen of information requests that the security guard 124 proceed with the user validation process (or not), based on the user information 88 received from the wireless signals. The commodity user device 103-C includes a device touch screen display 1470 upon which the user interface of the app 149 is displayed. In the illustrated example, the app 149 presents a set of buttons 70. Buttons 70-1 and 70-2 enable the operator/security guard 124 to answer "Yes" or "No," respectively, whether to proceed with the validation process for the user. Alternatively, selecting the "Cancel" button 73 exits from the validation process, which has the same effect as selection of the NO button 70-2.

Figure 2B:
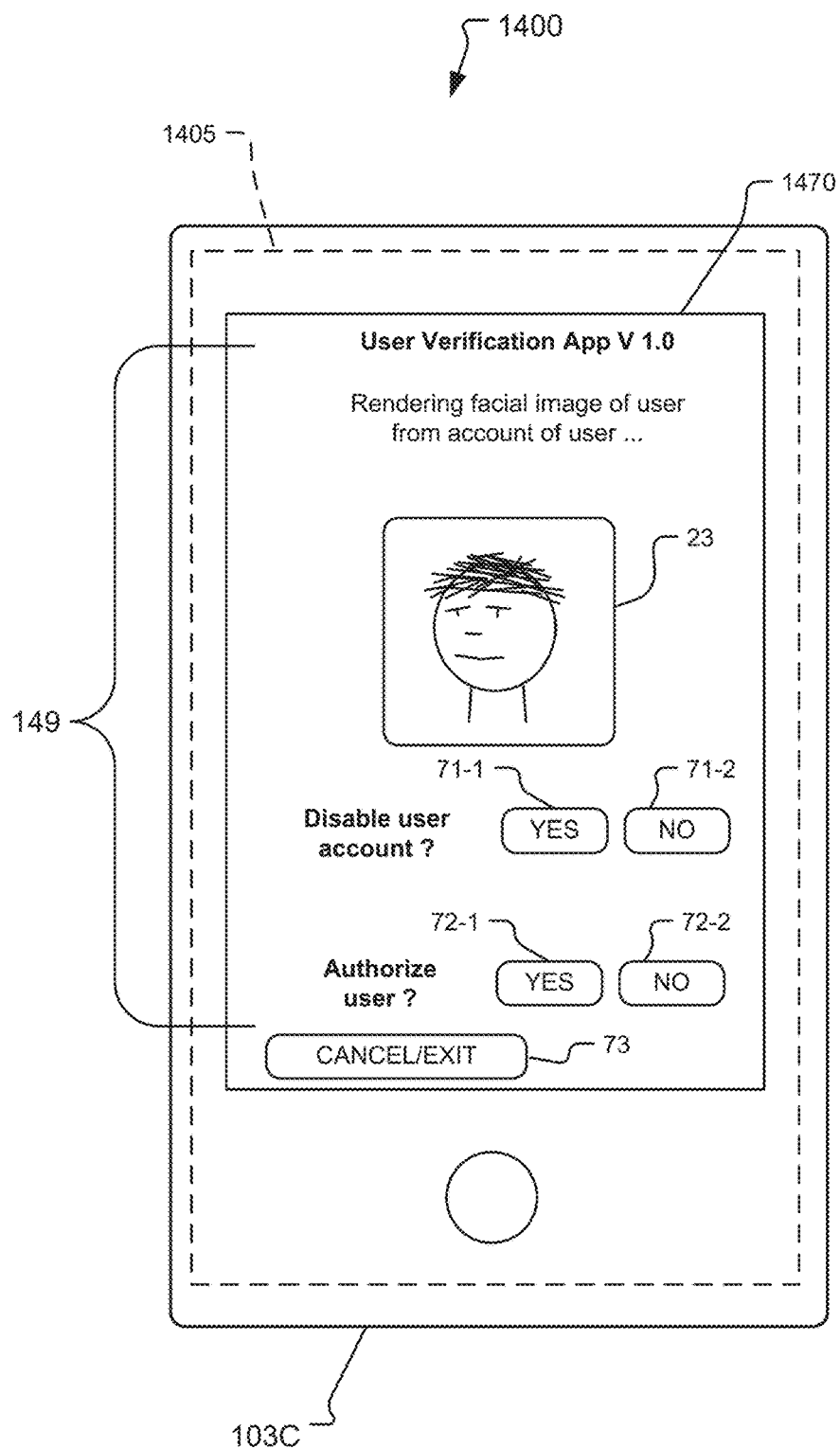

FIG. 2B shows a commodity user device 103-C of the portable device 1400 running an app 149 as in FIG. 2A. Here, the app 149 is displaying an additional screen of information for validating users. This additional screen of information was reached in response to the security guard 124 allowing the user validation process to continue in FIG. 2A.

Within the additional screen of information, the app 149 presents two sets of buttons 71 and 72. Buttons 71-1 and 71-2 enable the operator/security guard 124 to answer "Yes" or "No," respectively, whether to disable the user account for the user. In a similar vein, buttons 72-1 and 72-2 enable the operator/security guard 124 to answer "Yes" or "No," respectively, whether to authorize the user. Button 73 allows the operator to cancel/exit from the validation process.

In the illustrated example, the app 149 has received user information 88 sent from a target user device 103 carried by the user, and has matched the received user information 88 to user information 88 included within a user account 19 for the user stored on the system controller 118 of the access control system 100. The app 149 acquired the picture identification information 91 from the user account 19, and rendered a facial image 23 of the user onto the device touch screen display 1470.

A security guard 124 can then visually compare the actual face of the user targeted by the portable device 1400 and its directional antenna system 1405 to the facial image 23 of the user rendered by the app 149. In another example, the security guard 124 additionally uses the camera 1430 of the commodity user device 103-C to take a photo image of the targeted user. Once the app 149 has matched the received user information 88 from the target user device to the user information 88 within a user account 19 on the system controller 118, and rendered the facial image 23 of the user from the user account 19, the app 149 itself can then validate the user by comparing the photo image of the user to the facial image 23 from the user account 19 associated with the target user device.

In any event, if the app 149 or the security guard 124 using the app determine that the user is a valid user (i.e. either the photo image of the user and the facial image 23 of the user match, or the security guard 124 determines that the facial image 23 of the user matches the actual face of the user) or not, the security guard 124 can select sets of buttons 71 and/or 72 to send associated messages to the access control system 100.

Selection of button 71-1 sends a message which instructs the access control system 100 to disable the user account 19 for the user, and selection of button 71-2 sends a message which instructs the access control system 100 to not disable the user account 19 for the user. The security guard 124 would likely select button 71-1 upon determining that the user was not a valid user for the target user device. In other implementations, selection of button 71-1 sends a message via the app 149 to the access control system 100 to deactivate the target user device 103 associated with the user account 19, or to both disable the user account 19 for the user and deactivate the target user device 103 associated with the user account 19. Alternatively, selecting the "Cancel" button exits from the validation operation, which has the same effect as selection of the NO button 71-2.

Finally, the security guard 124 can optionally authorize the user for entry to an access point in response to determining that the user was a valid user. Selection of button 71-1 sends a message which instructs the access control system 100 to authorize the user account 19 (and therefore the user). Otherwise, the security guard 124 can select button 72-2 to send a message which instructs the access control system 100 to not authorize the user account 19. Alternatively, selecting the "Cancel" button exits from the validation operation, which has the same effect as selection of the NO button 72-2.

Figure 3:
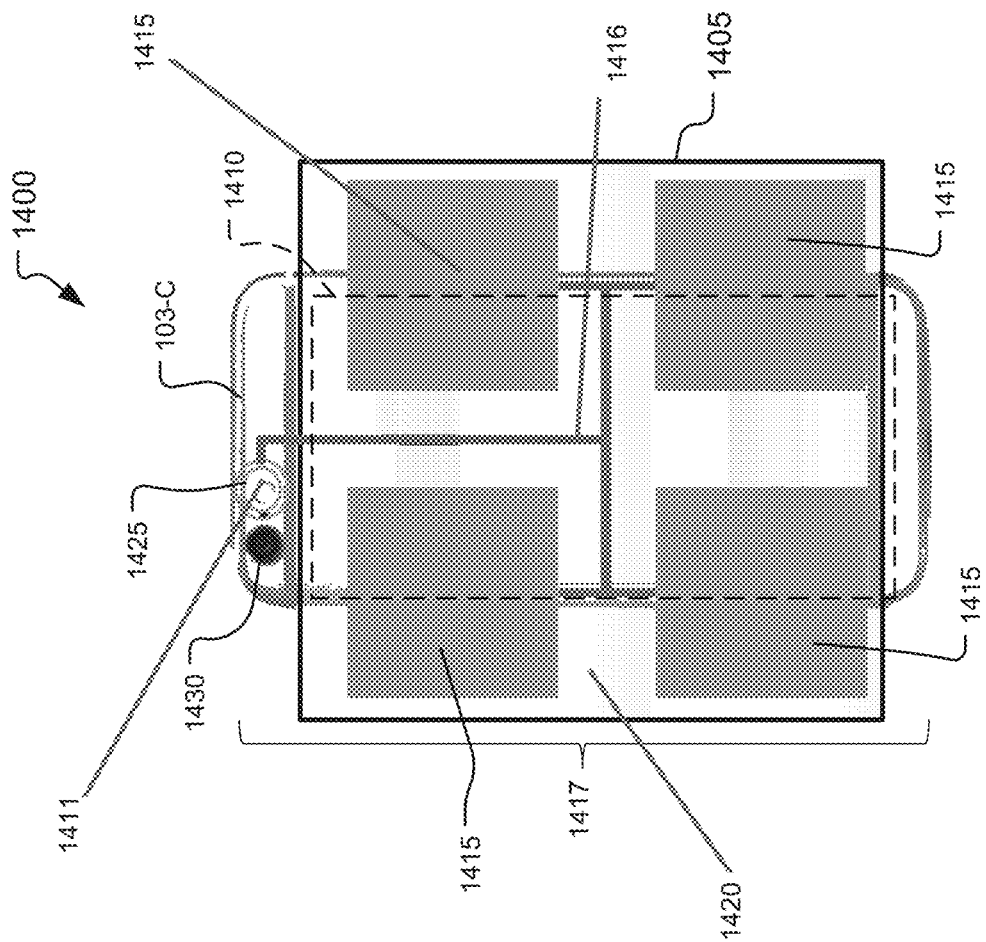
FIG. 3 is a schematic diagram showing a back view of the portable device, where a directional antenna system of the portable device is installed on the back of the commodity user device, and where the directional antenna system is preferably used to detect wireless signal transmissions/emissions from the target user devices.

FIG. 3 is a schematic diagram showing a back view of the portable device 1400. In this embodiment, the directional antenna system 1405 has four (4) BLE patch antenna elements 1415 that are fully opened or deployed. The commodity user device 103-C also has a camera 1430 and an internal BLE antenna 1411.

In more detail, in one embodiment, a custom case or holder 1410 is installed on the backside of the commodity user device 103-C. The holder 1410 includes a preferably collapsible/foldable BLE (2.4 MHz) directional antenna system 1405. In the illustrated example, directional antenna system 1405 includes four (4) or more passive patch antenna elements 1415. The four elements 1415 are electrically connected via a flexible circuit board 1416 formed in a backplane/ground plane substrate 1420, or ground plane.

The ground plane 1420 of the directional antenna system 1405, in turn, terminates on a back of the commodity user device 103-C.

These patch antenna elements 1405 form a fixed phased array antenna that has the required receive pattern 12 to provide the desired directionality.

In general, in many embodiments, the directional antenna system 1405 when in its folded state is about the size of the commodity user device 103-C to which the directional antenna system 1405 is attached. In one example, a height 1417 of the commodity user device 103-C is as large as 30 centimeters (cm) (in the case of larger mobile/phablet target user devices 103, in examples), and therefore, the directional antenna system 1405 is similar in height but smaller. In another example, the height 1417 of the commodity user device 103-C is approximately less than 20 cm. In yet another example, the height 1417 of the commodity user device 103-C is approximately 14 cm.

In typical embodiments, the directional antenna 1405, when unfolded, is less than 30 cm wide and 30 cm tall, i.e., in the two dimensions of the plane of the figure. Preferably, the directional antenna 1405, when unfolded, is less than less than 15 cm wide and 15 cm tall. As such, in the current embodiment illustrated in FIG. 3, the patch antenna elements 1415 are approximately 60 mm wide and 60 mm tall (+/−5 mm). In a preferred embodiment, each of the four (4) patch antenna elements is a half-wavelength Bluetooth Low Energy (BLE) antenna.

In one example, the directional antenna system 1405 capacitively couples to the internal BLE antenna 1411 integrated in the commodity user device 103-C via a capacitive coupling conductive plane 1425. In another example, the directional antenna system 1405 is a separately powered device that provides data to the commodity user device 103-C via a wired data port (e.g. micro USB port) of the commodity user device 103-C or over a secure peer to peer BLE or nearfield data connection. In yet another example, the directional antenna system 1405 is inductively coupled to the internal BLE antenna 1411 of the commodity user device 103-C.

In other examples, active, phased array patch antenna elements 1415 are used to implement the directional antenna 1405. In one such example, the directional antenna system 1405 is tunable in its directivity such that it can convert from wide angle scanning to narrow path detection of BLE transmissions from other BLE-enabled devices. In a narrow path detection mode, the portable device 1400 including the directional antenna system 1405 can isolate BLE transmissions from target user devices 103 carried by a particular person 104 in a room or can isolate BLE transmissions from a particular laptop upon a table in a room, in examples.

In operation, the directional antenna system 1405 will be used for physically locating specific beacons/transmitted wireless signals within an area of a premises 102 for user identity verification. In one example, a security guard 124 would use the portable device 1400 including the directional antenna system 1405 to scan individuals around a conference table or in a room to determine which BLE transmissions are coming from an unregistered target user device 103 or coming from a target user device 103 with an expired security token 98, for example.

Figure 4:
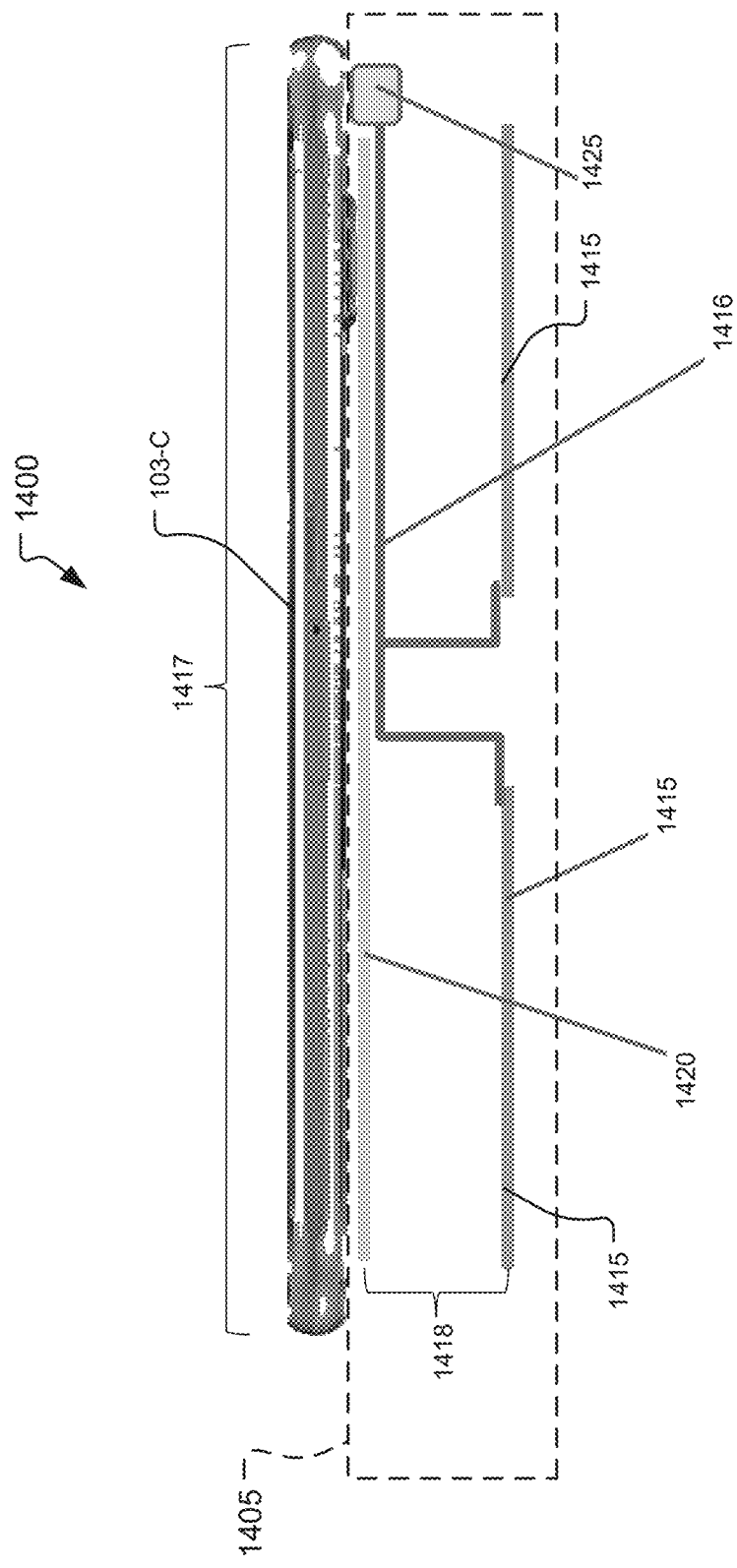
FIG. 4 is a schematic diagram showing a side view of the portable device.

FIG. 4 is a schematic diagram showing a side view of the portable device 1400 with the directional antenna system 1405. As in FIG. 3, the patch antenna elements 1415 are unfolded/deployed. Here, the case/holder 1410 is removed to show a side view of the ground plane 1420. The distance between the back of the commodity user device 103-C and the directional antenna system 1405, when fully deployed, is indicated by reference 1418. In one embodiment, this distance 1418 is approximately 18 mm+/−3 mm.

FIG. 5A is a schematic diagram showing a back view of the portable device 1400 with the directional antenna system 1405 contracted (e.g. folded) and FIG. 5B is a schematic diagram showing an end view of a top edge of the portable device 1400 with the directional antenna system 1405 folded.

In operation, by removing the portable device 1400 from the holder 1410, the four patch antenna elements 1415 spring out from their folded position into their expanded or deployed position. Thus, the directional antenna system 1405 can be pointed toward the person carrying a BLE-enabled or other wireless-enabled target user device 103 to be identified. In one example, a corresponding phone application 149 executing on the commodity user device 103-C will be able to differentiate the signal strength of a particular user's beacon device from signal strengths of other beacon devices within the range of the portable device 1400.

Preferably, the application 149 executing on the commodity user device 103-C of the portable device 1400 utilizes the signal gain of the directional antenna system 1405 to isolate the beacon signal of the targeted user via his/her target user device 103.

As a possible option, the four patch antenna elements 1415 will be mounted directly to the ground plane 1420. The ground plane 1420, in one implementation, will be flexible and capable of folding to conceal the four patch array elements 1415 and circuit board 1416 or capable of expanding to provide the necessary patch array element 1415 positioning gain and directionality.

As another possible option, the ground plane 1420 will be eliminated and the ground will be an integral part of the patch antenna elements 1415. A flexible substrate will be provided to maintain the necessary dimensional relationships between the patch antenna elements 1415.

A capacitive coupling plane 1425 preferably transfers the directional antenna signal from the directional antenna system 1405 into the existing omnidirectional antenna 1411 of the commodity user device 103. As an option, an inductive coupling capability is provided between the directional antenna system 1405 and the existing omnidirectional antenna of the commodity user device 103.

In one mode of operation, the commodity user device 103-C of the portable device 1400 uses its camera 1430 to take a picture of an individual at whom the directional antenna system 1405 is pointed. The commodity user device 103-C then compares the BLE emissions from the individual such as from the individual's target user device 103. At the same time, the commodity user device 103-C performs facial recognition on the individual via a biometric analysis application 149 running on the commodity user device 103-C. In this way, the portable device 1400 confirms that the security tokens in the BLE emissions match the individual possessing the user device.

FIG. 6 is a sequence diagram showing how a security guard as in FIG. 1 can utilize the portable device including the directional antenna system 1405 and commodity user device 103-C to validate individuals carrying target user devices 103 against an access control system 100.

In step 202, a security guard 124 holding the portable device 1400 invokes an app 149 running on the commodity user device 103-C of the portable device 1400. According to step 204, the patch antenna elements 1415 of the directional antenna system 1405 are deployed (e.g. unfolded) and a boresight 13 of directional antenna system 1405 is pointed by the security guard 124 at a target user device 103 carried by an individual of interest.

In step 206, the portable user device 1400 receive wireless signals according to the receive pattern 12 of the directional antenna system 1405, where the wireless signals include packet data 105 including user information 88 identifying the user. Then, in step 208, the app 149 sends a notification to the security guard 124 that the directional antenna system 1405 has locked onto a wireless signal. According to step 210, in response to receiving the notification of locked wireless signal, the guard 124 selects a button 70-1 (see FIG. 2A) within the app 149 to extract user information from the wireless signal and to send user information 88 to the system controller 118 of the access control system 100 to begin the validation process.

In step 212, as a result of the security guard 124 selecting button 70-1 to proceed with the validation, the portable device 1400 sends the user information 88 to the system controller 118. In step 214, the system controller 118 executes a lookup of the received user information 88 against that included within stored user accounts 19 of the users. Upon finding a match, in step 216, the system controller 118 sends the matching user account 19 back to the portable device 1400 for further processing by the app 149.

In step 218, the app 149 renders a facial image 23 of the user from video identification information 91 of the user account 19. Then, in step 220, the security guard 124 determines whether the face of the user matches the facial image 23 of user rendered from the user account 19. In step 222, if the security guard determines that the face of the user and the rendered image of the user do not match, the security selects a button 71-1 (See FIG. 2B) within the app 149 to disable the user account 19 and notify additional security personnel of user.

It can also be appreciated that the security guard in step 218 can alternatively take a photo of the targeted user via the camera 1430 of the commodity user device 103-C of the portable device 1400. Then, instead of the security guard 124 validating the user by comparing the face of the user to the rendered facial image 23, the security guard 124 can input the photo of the targeted user into the app 149, and the app 149 can compare the photo of the targeted user to the facial image 23 to validate the user. In yet another example, the app 149 and/or commodity user device 103-C may include a fingerprint scanner 201 that enables the security guard 124 to generate a fingerprint of the targeted user, and compare the fingerprint of the targeted user to a fingerprint biometric identifier 93 within the user account 19 to validate the user.

Finally, in step 224, in response to the selection of the button 71-1, the app 149 sends a message to the system controller 118 to disable the user account 19, and/or to possibly deactivate the target user device 103 associated with the user account 19.

While this invention has been particularly shown and described with references to preferred embodiments thereof, it will be understood by those skilled in the art that various changes in form and details may be made therein without departing from the scope of the invention encompassed by the appended claims.

What is claimed is:

1. A portable device for analyzing user information broadcast from target user devices, the portable device including:
   a directional antenna system for receiving the user information broadcast from the target user devices; and a commodity user device including a touchscreen display and an integrated internal antenna, wherein the directional antenna system is coupled to the internal antenna of the commodity user device;

wherein an app executing on the commodity user device enables accessing of an account for a user corresponding to the user information by performing a lookup of the user information against stored user accounts within an access control system, wherein the stored user accounts include stored user information and stored image identification information of the users, the user device receiving the account for the user from the access control system in response to the user information matching the stored user information of the account for the user, and rendering a facial image of the user from the image identification information within the account for the user on the touchscreen display of the commodity user device.

2. The portable device of claim 1, wherein the directional antenna system comprises four or more patch antenna elements.

3. The portable device of claim 1, wherein the directional antenna system comprises antenna elements and a flexible circuit board on which the antenna elements are located.

4. The portable device of claim 1, wherein the directional antenna system is capacitively and/or inductively coupled to the internal antenna of the commodity user device.

5. The portable device of claim 1, wherein the directional antenna system is a Bluetooth antenna including one or more patch antenna elements.

6. The portable device of claim 1, wherein the directional antenna system includes four (4) patch antenna elements, each of which are half-wavelength Bluetooth Low Energy (BLE) antennas.

7. The portable device of claim 1, wherein the directional antenna system is characterized by a receive pattern that has a half power beamwidth of a main lobe of less than 50 degrees.

8. The portable device of claim 1, wherein the directional antenna system is characterized by a receive pattern that has a half power beamwidth of a main lobe of less than 30 degrees.

9. The portable device of claim 1, wherein the directional antenna system is characterized by a receive pattern that has a half power beamwidth of a main lobe of less than 10 degrees.

10. The portable device of claim 1, wherein the directional antenna system is foldable.

11. The portable device of claim 1, wherein the directional antenna system further comprises a flexible ground plane that terminates on a back of the commodity user device.

12. A method for analyzing wireless signals from target user devices, comprising:

detecting the wireless signals using a directional antenna system;

extracting user information from the wireless signals; and accessing an account for a user corresponding to the user information with a commodity user device including a touchscreen display and an integrated internal antenna, wherein the directional antenna system is coupled to the internal antenna of the commodity user device; and wherein accessing an account for a user corresponding to the user information comprises:

an app executing on the commodity user device performing a lookup of the user information against stored user accounts within an access control system, wherein the stored user accounts include stored user information and stored video identification information of the users;

the app receiving the account for the user from the access control system in response to the user information matching the stored user information of the account for the user; and the app rendering a facial image of the user from the video identification information within the account for the user on the touchscreen display of the commodity user device.

13. The method of claim 12, wherein detecting the wireless signals using the directional antenna system comprises:

pointing a boresight of the directional antenna system at the target user devices; and receiving the wireless signals according to a receive pattern of the directional antenna system.

14. The method of claim 13, wherein receiving the wireless signals according to the receive pattern of the directional antenna system comprises receiving the wireless signals within a main lobe of the receive pattern.

15. The method of claim 12, wherein in response to detecting the wireless signals using the directional antenna system, sending a notification indicating that the directional antenna system has locked onto the wireless signals.

16. The method of claim 12, further comprising a security guard determining whether a face of the user carrying the target user device matches the facial information of the user rendered from the video identification information within the account for the user to confirm an identity of the user carrying the target user device.

17. The method of claim 16, wherein in response to the security guard determining that the face of the user carrying the user device does not match the facial information of the user rendered from the video identification information within the account for the user, the security guard sending a message via the app to the access control system to disable the user account and/or deactivate the target user device associated with the user account.

\* \* \* \* \*